UNITED STATES PATENT OFFICE.

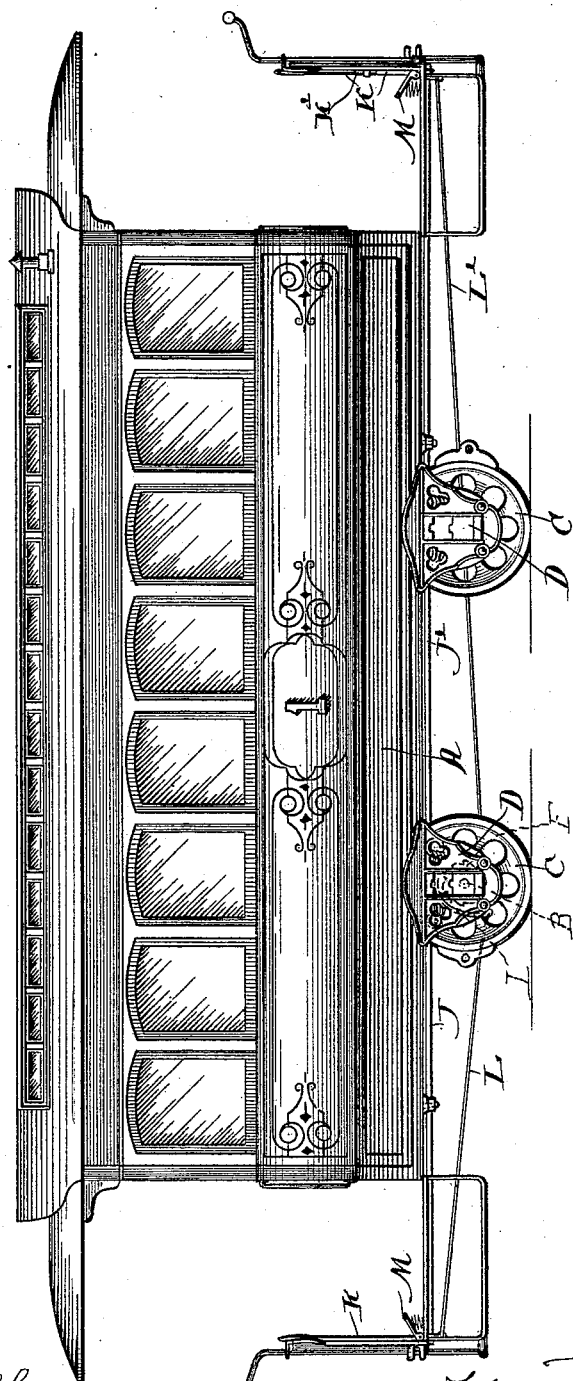

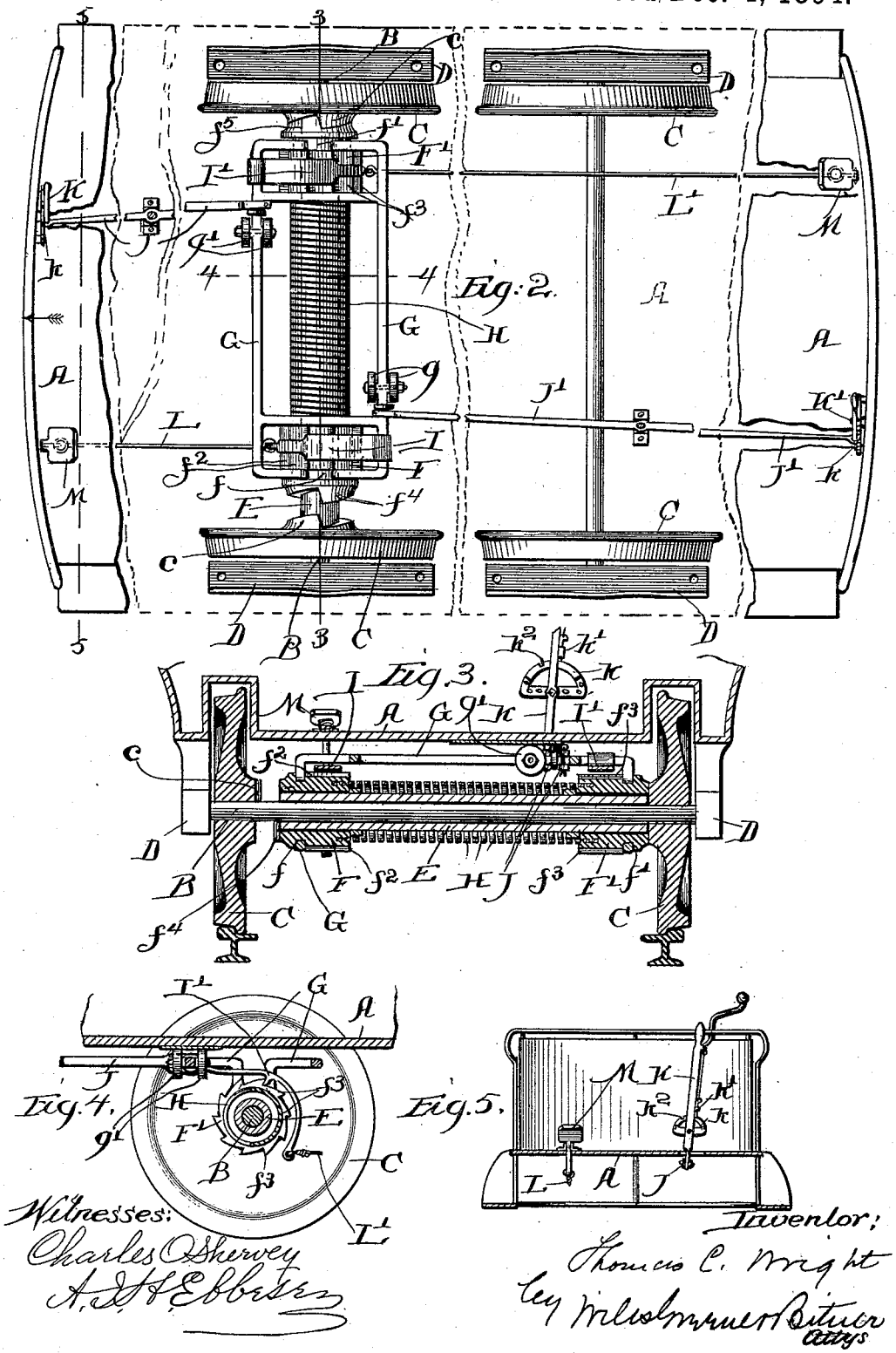

THOMAS C. WRIGHT, OF CHICAGO, ILLINOIS.

CAR-STARTER.

SPECIFICATION forming part of Letters Patent No. 530,150, dated December 4, 1894.

Application filed March 19, 1894. Serial No. 504,146. (No model.)

*To all whom it may concern:*

Be it known that I, THOMAS C. WRIGHT, a citizen of the United States of America, residing at Chicago, in the county of Cook and State of Illinois, have invented certain new and useful Improvements in Car-Starters, of which the following is a specification.

My invention relates to certain improvements in car starters designed to simplify and cheapen the same.

To such end it consists in certain features of construction fully described below and defined in the appended claims.

The drawings illustrate the invention by means of five figures, of which—

Figure 1 is a side elevation of a car showing my improvements. Fig. 2 is an under plan of the same with portions broken away to shorten the view. Fig. 3 is a vertical section in line 3—3, of Fig. 2. Fig. 4 is a transverse section in line 4—4, of Fig. 2; and Fig. 5 is a vertical section in line 5—5, of Fig. 2.

In the figures, the body of the car is shown at A, one of the axles at B, the wheels at C, and the boxes at D, which, as is customary, receive the axle upon the outside of the wheels.

Between the wheels and about the axle is a loose collar, E, extending from wheel to wheel and carrying upon its opposite ends two outside collars, F, F', loose upon the collar, E. These collars, F, F', are spaced apart by means of a rigid frame, G, in which the collars turn, but which is prevented from sliding lengthwise thereon by means of grooves, $f, f'$, in which the ends of the frame, G, run. Besides these grooves, each of the collars bears ratchet teeth, $f^2, f^3$, around its periphery inside of the groove and cam-shaped teeth, $f^4, f^5$, upon the ends adjacent to the wheels. The wheels are also provided with cam-shaped teeth, $c$, fitted to those upon the collars and adapted to engage therewith. The rigid frame, G, spaces the collars, F, F', apart a distance somewhat less than that between the cam-shaped teeth upon the wheels and said collars are arranged to slide longitudinally of the inner collar, E, to alternately engage with the opposite wheels. The cam-shaped teeth, $c, f^4, f^5$, are arranged to engage in opposite directions and a coiled spring, H, extends between the collars, F, F', and has its opposite ends fastened thereto, the spring being wound in such a direction that the cam-shaped teeth upon the sliding collars and the wheels may wind up or increase the tension.

Above the ratchet teeth upon the sliding collars are gravity pawls, I, I' adapted to engage with said ratchet teeth in opposite directions to the tension of the spring at its respective ends.

For the purpose of sliding the frame, G, back and forth to make the proper engagement with the wheels, levers, J, J', are pivoted between their ends beneath the car and are fastened to hand levers, K, K' pivoted in an upright position at the opposite ends of the car, said hand levers being provided with segments, $k$, and spring latches, $k'$, said segments, however, containing but one tooth each, $k^2$, and the same being placed on the side toward which the lever is thrown in starting the car.

To prevent twisting of the frame, G, by the spring, H, I provide two rollers, $g, g'$, upon the frame adapted to rest against brackets upon the bottom of the car, said rollers being placed at the portions of the frame which the spring tends to throw upward.

For the purpose of releasing the pawls, I, I', when desired, I connect depending arms upon the same by means of rods, L, L', with foot levers, M, extending through the floor of the car where they may be reached by the driver or the conductor.

In operation the conductor winds up the spring by throwing the hand lever at the rear end of the car in the proper direction to make the necessary engagement with one of the wheels. The cam-shaped teeth thus thrown into engagement have their meeting surfaces upon such an incline that when the proper tension is reached, the sliding frame will be automatically forced inward to a middle position out of engagement with either wheel, and the spring will be kept under tension by means of the gravity pawls. When the car stops, the conductor throws the hand lever in the opposite direction, presses his foot upon the foot lever, M, and the force of the spring starts the car.

I claim as new and desire to secure by Letters Patent—

1. In a car starter, the combination with the car, wheels, and axles of a loose inner collar upon one of the axles, two loose outer collars upon the opposite ends of the inner collar and spaced apart slightly less than the distance between the wheels, of a frame in which said outer collars turn, means for sliding said frame back and forth longitudinally of the axle, a coiled spring between the outer collars and attached thereto at its opposite ends, ratchet teeth upon said outer collars and pawls pivoted upon the frame in position to engage with said ratchet teeth, means for releasing said pawls, cam-shaped clutch teeth upon the outer ends of the outer collars and oppositely arranged teeth upon the axle adapted to engage with said cam-shaped teeth, the meeting surfaces of such teeth being sufficiently inclined to enable the turning of the axle to force the said teeth out of engagement when the tension of the spring offers a predetermined resistance; substantially as described.

2. The combination in a device of the class described and with a frame, G, containing the spring, E, tending when under tension to twist said frame, of the rollers, $g$, $g'$, adapted to rest upon the bottom of the car and thereby to resist such tendency of the spring to twist the frame substantially as described.

In witness whereof I have hereunto set my hand, this 15th day of March, A. D. 1894, at Chicago, in the county of Cook and State of Illinois.

THOMAS C. WRIGHT.

Witnesses:
CHARLES O. SHERVEY,
A. I. H. EBBESEN.